United States Patent Office 2,711,423
Patented June 21, 1955

2,711,423
NEUTRAL CALCIUM 4-AMINOSALICYLATE HEMIHYDRATE AND PREPARATION OF THE SAME

James Miller Smith, Jr., Plainfield, N. J., and Richard Paul Germann, Warwick, R. I., assignors to American Cyanamid Company, New York, N. Y., a corporation of Maine No Drawing. Continuation of application Serial No. 263,514, December 26, 1951. This application July 6, 1953, Serial No. 366,388

4 Claims. (Cl. 260—519)

This invention relates to the neutral calcium salts of 4-aminosalicylic acid and their preparation. More particularly, it relates to a water-soluble calcium 4-aminosalicylate hemihydrate which is highly suitable for therapeutic applications to tuberculosis in human beings, and is stable under conditions of storage; and to the dihydrate, valuable as an intermediate for its preparation.

The importance and effectiveness of 4-aminosalicylic acid in the treatment of tuberculosis in human beings is well established. Customarily, the drug is given in high doses, about 10 to 20 grams a day, and it was early recognized that such large quantities of an acidic substance might cause complications in the gastrointestinal tract. Therefore, the sodium salt of 4-aminosalicylic acid has been used in the therapy of tuberculosis with some success. In a disturbingly high percentage of cases, however, the large amounts of sodium thus ingested by the patient causes an upset in the sodium-potassium balance in the body, with attendant undesirable side reactions. Since calcium tends to be excreted readily, rather than accumulating in the body fluids, a calcium salt of 4-aminosalicylic acid is a more desirable form for administration to human beings, and avoids the disadvantages cited above.

It would appear that making the calcium salt of an aromatic carboxylic acid would be a simple matter, obvious to anyone skilled in the art. However, we have found that the presence of an amino group in the 4-position and a hydroxyl group in the 2-position introduce unexpected difficulties into the process. The inherent properties of the calcium salts, the degree of hydration, for example, also make the preparation a difficult problem.

One of the objects of this invention is to manufacture calcium 4-aminosalicylate hemihydrate of high quality which is stable and suitable for drug use.

Since 4-aminosalicylic acid contains two acidic groups, i. e., two hydrogens capable of being replaced by metal cations, both a mono-, or "neutral," and a di-, or "basic" metallic salt are possible. We have prepared two calcium salts of 4-aminosalicylic acid which in their anhydrous states correspond to the formulas below:

Neutral salt

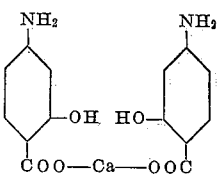

Basic salt

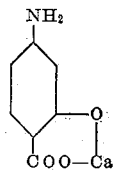

Subsequent to the completion of our work, it was suggested by Roth et al., Helv. Chim. Acta 34, 432 (1951), that the basic salt is a complex ion which may be represented by the structure:

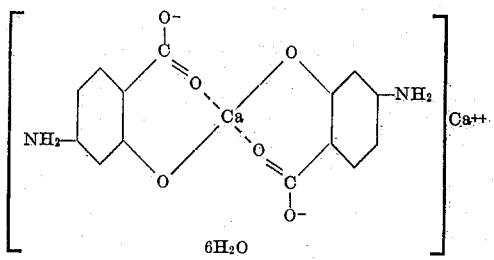

In view of the well-known tendency of ortho-hydroxy benzoic acids to form such complexes, and the extreme insolubility of the basic salt, the suggested formula has some merit, but it is not possible to say with certainty that it actually has this structure.

In copending application Serial No. 175,666 filed July 24, 1950, now Patent No. 2,611,732, is described the preparation of the insoluble basic calcium salt of 4-aminosalicylic acid. This product is prepared from 4-aminosalicylic acid by solution in aqueous sodium hydroxide and addition of an equivalent quantity of aqueous calcium chloride, followed by an excess of sodium hydroxide. The precipitation when washed copiously with water to remove sodium chloride and then dried, is essentially pure basic calcium 4-aminosalicylate.

The basic calcium 4-aminosalicylate is associated with three molecules of water and corresponds to the formula $$C_7H_5O_3NCa.3H_2O$$

This salt serves as an excellent means of isolating 4-aminosalicylic acid free of impurities. However, it is so insoluble in water that solutions for drug use cannot be prepared directly from it.

The application referred to above also describes and claims a mechanical mixture of the basic calcium salt with 4-aminosalicylic acid in equimolecular amounts, which mixture is soluble in water. We have now found that when the basic calcium salt of 4-aminosalicylic acid is suspended in water and treated with 4-aminosalicylic acid in equimolecular amount, at about 30° to 60° C., the soluble neutral salt which is formed can be isolated and recovered by a process which is commercially feasible. A temperature near 50° C. is preferred and the amount of water used should be such that on cooling from 50° C. to about 0–10° C., the greater part of the neutral calcium 4-aminosalicylate crystallizes out from the solution and can be recovered by filtration or centrifugation.

We have further found that two different hydrates of the neutral salt can be prepared under different conditions and we have isolated both forms. When a solution of the neutral calcium salt at 50° C. is cooled to between 0° and 15° C., as is customary for best yields of the neutral salt, the dihydrate is the form most easily isolated due to its solubility properties. Unfortunately, it is metastable, and on storage in powder form it loses a portion of its water, and forms a sticky mixture of the hemihydrate which decomposes on standing because of the presence of free water. The hemihydrate in the dry state is quite stable over long periods of time and is soluble to the extent of about 50% in water.

The two forms are theoretically convertible one to the other near the transition temperature which is in the range of 0–15° C. Above the transition temperature the hemihydrate is theoretically the stable form; with the dihydrate theoretically the stable form below this temperature. Practically, because of the slow rate of conversion and ease of crystallization of the dihydrate, it tends to precipitate both above and below the transition temperature. At temperatures considerably above the transition temperature, the hemihydrate tends to precipitate, but extensive losses are incurred because of high solubility of the hemihydrate at such high temperature. Thus, it is impractical to isolate the hemihydrate by a direct crystallization procedure from aqueous solution.

The optical and crystallographic properties of the dihydrate and the hemihydrate are distinct and different. The two are readily converted one into the other, indicating that the difference between the two crystalline modifications is degree of hydration. The dihydrate of neutral calcium 4-aminosalicylate occurs in the form of hexagonal plates, while the hemihydrate occurs as elongate prisms. The optical and crystallographic properties are given below:

| | Hemihydrate | Dihydrate |
|---|---|---|
| Morphology | Elongate prisms | Hexagonal plates. |
| Silhouette angle | | 110° ± |
| Extinction | Parallel and oblique | Symmetrical. |
| Optical orientation | One isogyre | Bx o ⊥ plates. |
| Refractive indices | $n\beta=1.635$ | $n\alpha=1.43$ |
| | $n_s=1.85$ | $n\beta=1.655$. |
| Optical character | (+) | (−). |

According to one phase of the present invention, the metastable dihydrate of neutral calcium 4-aminosalicylate is converted to the stable hemihydrate which is suitable for drug use. We have not found it possible to convert the dihydrate to the hemihydrate by drying at elevated temperatures because of excessive decomposition. However, this conversion can be brought about by allowing the dihydrate to stand in bulk powder form for one or two weeks at room temperature, then re-drying after conversion has been accomplished. The material must be re-dried because the damp cake of the hemihydrate is unstable and darkens rapidly even in a closed container, although if dried promptly at slightly elevated temperature, it is quite stable.

In the preferred embodiment of our invention, the conversion of the dihydrate to the hemihydrate is accomplished by suspending the dihydrate in an amount of water insufficient to dissolve all of it at 50° C. After heating a short time at about this temperature, the dihydrate is converted to the hemihydrate, which can be recovered by filtration or centrifugation without undue losses. By this process, the yield of neutral calcium 4-aminosalicylate hemihydrate, $Ca(C_7H_6O_3N)_2 \cdot \frac{1}{2}H_2O$ is in excess of 50% based on 4-aminosalicylic acid, and the quality is suited to drug use.

In our experience, any attempt to concentrate an aqueous solution of calcium 4-aminosalicylate results in darkening and turbidity, due probably to decomposition. These results have been verified by Roth et al., who prepared a yellow-colored calcium salt of 4-aminosalicylic acid by the reaction of calcium carbonate and 4-aminosalicylic acid in water, clarification after evolution of $CO_2$ ceased, and concentration of the yellow solution under vacuum at 30° to 40° C. to induce crystallization. The yield was "almost quantitative" and after drying six hours at 90° C. in vacuum, the analysis for calcium corresponded to the formula $C_{14}H_{12}O_6N_2Ca$. The process of Roth et al. requires expensive vacuum equipment both for the concentration step and for the drying step. Their product is impure.

It is a further embodiment of our invention that the aqueous liquors be washed out of neutral calcium 4-aminosalicylate dihydrate and hemihydrate isolation cakes by an inert solvent, such as isopropanol, propanol or sec.-butanol. The solvent not only removes the bulk of the aqueous liquors, but in drying, caking is prevented and the solvent is readily removed at 50° to 60° C., and it also removes the last traces of occluded water as the azeotrope. Isopropanol is our preferred solvent.

The use of the above solvents appears to be quite specific in that their action is very different from the lower alcohols, methanol and ethanol, which form stable alcoholates with neutral calcium 4-aminosalicylate. These alcoholates can not be broken down by drying under conditions which avoid darkening and decomposition of the product. Although it is not known with certainty that isopropanol can also form an alcoholate with neutral calcium 4-aminosalicylate, this particular alcohol is readily removed without discoloration or decomposition of the residual hemihydrate. Attempts to substitute solvents other than those mentioned above in our process were without success. Acetone reacts in some way with neutral calcium 4-aminosalicylate. When used as a wash, ether, or ethyl acetate and toluene, caused darkening of the product on drying. Higher alcohols, such as the amyl alcohols, are difficult to remove by air-drying at 50° to 60° C., and tend to leave objectionable odors in the product when present in traces.

The neutral calcium 4-aminosalicylate hemihydrate produced by our process is white in color and forms a clear, essentially colorless solution in water.

*Example 1*

To a slurry of 3.2 parts of sodium bicarbonate in 15 parts of water is added slowly 5.7 parts of 4-aminosalicylic acid. To this solution is added a solution of 4.55 parts of calcium chloride in 20 parts of water, which has been clarified to remove suspended impurities. The mixture is stirred a few minutes, and then a solution of 1.48 parts of sodium hydroxide in 5 parts of water is added at 20–25° C. with rapid stirring. The basic calcium salt of 4-aminosalicylic acid precipitates. It is filtered and washed chloride-free with water. It is advisable to perform the operations of this example, which involve the 4-aminosalicylate, under an inert atmosphere. We prefer to use calcium chloride as a source of calcium ions, because it can be obtained in commercial quantities in a high state of purity. The lime or calcium carbonate of commerce usually contain appreciable amounts of impurities, such as iron, which are deleterious to the production of drug-quality material. The total product recovered amounts to approximately 8.2–8.6 parts (89.5–95% yield).

*Example 2*

To 10 parts of water the basic calcium 4-aminosalicylate (8.4 parts) from Example 1 is added, in small portions alternately with 4-aminosalicylic acid, so that the final pH is about 6.8 to 7.2. Approximately 5.1 to 5.4 parts of 4-aminosalicylic acid and 8.2–8.6 parts of calcium 4-aminosalicylate will be required. The volume is adjusted to 30 parts by volume, and the temperature is maintained at 40° to 45° C. until solution is complete. It is preferred to carry out these operations under an inert atmosphere. The solution is clarified, then cooled to 0°–2° C. After about 15 to 30 minutes at this temperature, the precipitate is collected on the filter, and washed with isopropanol to displace the aqueous liquors. It is then dried at 55° C. to constant weight, and there is obtained the neutral calcium 4-aminosalicylate dihydrate as a white powder. It gives a clear solution in water, with a pH of 6.8 to 7.2.

*Example 3*

Neutral calcium 4-aminosalicylate dihydrate is stored in suitable containers at room temperature. In general practice, where several pounds will be in each container, the dihydrate usually converts to the hemihydrate, with loss of 1.5 mols of water, in one to three weeks. The damp cake is re-dried to constant weight to give neutral calcium 4-aminosalicylate hemihydrate, a stable, white powder, suitable for drug use. The damp cake may be washed with isopropanol before drying.

Example 4

Neutral calcium 4-aminosalicylate dihydrate, prepared as in Example 2 from 75 parts basic calcium 4-aminosalicylate and 46 parts of 4-aminosalicylic acid, is suspended as the wet filter cake in about 50 parts by volume of a 15% aqueous solution of neutral calcium 4-aminosalicylate and heated at about 50° C. for 45 minutes under nitrogen. The change from the dihydrate to the hemihydrate is followed by observation of the crystal form in samples under the microscope. When the conversion of the hemihydrate is complete, the mixture is cooled rapidly to 30° C. and filtered at that temperature. The filter cake is washed with isopropanol to displace aqueous liquors, and the product is dried at 45–55° C. The yield is about 63 parts of neutral calcium 4-aminosalicylate hemihydrate.

The present application is a continuation of my application Ser. No. 263,514 filed on December 26, 1951, now abandoned.

We claim:

1. Substantially pure neutral calcium 4-aminosalicylate hemihydrate substantially free of water other than that combined as water of crystallization.

2. A process for the manufacture of neutral calcium 4-aminosalicylate hemihydrate which comprises heating the neutral calcium 4-aminosalicylate dihydrate at about 50° C. to 60° C. in the presence of a small amount of water until said dihydrate is essentially converted into the hemihydrate; and separating the hemihydrate from excess water.

3. A process for the manufacture of neutral calcium 4-aminosalicylate hemihydrate which comprises heating the neutral calcium 4-aminosalicylate dihydrate at about 50° C. to 60° C. in the presence of a small amount of water until said dihydrate is essentially converted into the hemihydrate; separating the hemihydrate from excess water; washing said hemihydrate with an aliphatic alcohol containing not more than four and not less than three carbon atoms; and drying at a temperature which does not discolor said hemihydrate.

4. A process according to claim 3 in which said aliphatic alcohol is isopropanol.

References Cited in the file of this patent

UNITED STATES PATENTS 2,580,195     Rosdahl _____ Dec. 25, 1951